UNITED STATES PATENT OFFICE.

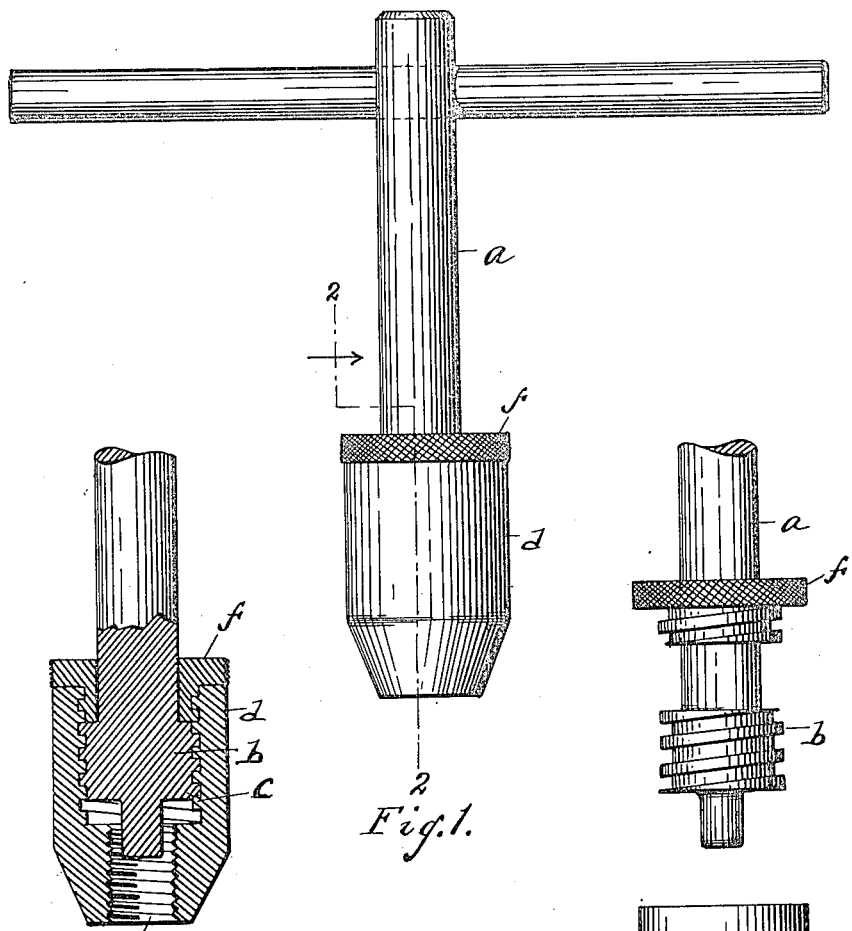

FRANK M. FUNK, OF DETROIT, MICHIGAN.

STUD-DRIVER.

1,298,324.  Specification of Letters Patent.  Patented Mar. 25, 1919.

Application filed November 18, 1918. Serial No. 262,931.

*To all whom it may concern:*

Be it known that I, FRANK M. FUNK, a citizen of the United States, residing at Detroit, county of Wayne, State of Michigan, have invented a new and useful Improvement in Stud-Drivers, of which the following is a specification.

This invention relates to a tool frequently called a stud driver for a use, similar to a socket wrench, in turning a screw into a threaded member. Such tools are also used for holding the threaded end of a nipple while the opposite end is threaded, and for similar purposes. Tools of this character are not broadly new, but it is thought that the present tool is a considerable improvement over those heretofore existing in strength, durability and efficiency of operation.

The tool is also capable of use with readily interchangeable socket members to fit studs of varying sizes.

In the drawings,—

Figure 1 is a side elevation.

Fig. 2 is a longitudinal section.

Fig. 3 is an elevational view showing how the parts are assembled.

In using a threaded socket member to engage the end of a screw stud it has been found that, if some provision is not made for releasing the head from the screw, like as not, the turning of the driver in the opposite direction, after the screw has been driven home, will cause the screw to back out with the driver. It has, therefore, been proposed to allow a free initial movement of the stem of the driver to back the end of the stem off from the screw stud by providing a lost motion connection between the socket member and the stem. This lost motion connection has in some cases been provided in the form of a slot in the socket member and a stud on the stem. It has been found that tools constructed in this way are not durable and that they frequently crack in manufacture and use. The forming of the slot is also a somewhat difficult mechanical operation. It is the object of the present invention to make a tool which can be manufactured more easily and which is very much more durable and can be made to back the end of the stem off from the end of the stud any desired distance, as there is no limit within reasonable bounds to the lost motion that can be provided.

The tool comprises simply a stem $a$ with an enlargement $b$ which is provided with a coarse screw-thread. This is adapted to engage in the threads $c$ of the inner end of the socket member or sleeve $d$. The outer end of the socket member is internally threaded as at $e$ to fit the stud threads. $f$ is a cap which engages in the inner end of the sleeve $d$ and has threads to turn into the coarse threads of the sleeve $d$. This in connection with the shoulder of the enlarged portion of the stem prevents the sleeve from dropping off from the stem.

A very important advantage of this form of construction is that the sleeve may be very readily assembled upon the stem simply by screwing this cap in the coarse threads of the stem after the sleeve has been run onto the threads of the enlarged portion of the stem. This is a very distinct advantage over the old slot and pin construction, which made it practically necessary to have a complete new tool for each size of stud as the sleeve part cannot be disassembled from the stem part without great difficulty in driving the pin out. In this new form of construction it is only necessary to have one stem and cap $f$ and a set of sleeves for different sizes of screw studs. Whenever the tool is to be used upon a different size stud it is only necessary to screw the sleeve off the cap $f$ and the enlarged portion $b$ of the stem and screw another sleeve onto these members.

The operation of the tool will be obvious. Take, for instance, the view shown in Fig. 2. The outer threaded end of the sleeve is started upon the threads of the stud. The turning of the stem will turn the stem and sleeve until finally the end of the stem jams down on the end of the stud. Thereupon further turning movement will turn the stud too until it is driven in the desired distance. Thereupon the turning movement of the stem is reversed. This causes the end of the stem to back off from the end of the stud until the sleeve begins to turn off the stud. As soon as the end of the stem disengages the end of the stud this will usually release the sleeve from the stud as it breaks the jammed relation between the threads of the driver and the threads of the stud. Inasmuch as the threads of the stud are of less pitch than the threads of the enlarged portion of the driver, it is ordinarily easier for the sleeve to turn upon the stud, the threads being equally loose, than for the stem to turn in the driver. However, after the enlarged portion has struck the cap $f$, which can be turned down until it jams against the inner end of the sleeve and to a certain extent locks itself in, the lost motion is taken up and the stem will turn the sleeve off the stud rather than turn the cap out of the sleeve.

What I claim is:

1. A stud driver, comprising a stem provided with threads, a sleeve threaded at its outer end to engage over a stud and further threaded interiorly to engage the threads of the stem and the threads of a cap nut, and a cap nut for engaging in the threads at the inner end of the sleeve and behind the threads of the stem, the said threads of the stem being of less length than the complementary threads of the sleeve when the cap is in place to establish a lost motion driving connection between the stem and the sleeve.

2. A stud driver, comprising a stem having an enlarged portion, a sleeve having an outer internally threaded end, and a cap fitted on the inner side of the enlarged portion of the stem and engaging with the inner end of the sleeve to hold the sleeve upon the stem, the said stem and sleeve having interengaging portions adapted with the cap to effect a lost motion driving connection between the two.

3. A stud driver, having in combination, a stem provided with a threaded portion, a sleeve having an outer end threaded to engage the stud and having a threaded portion to engage with the threaded portion of the stem, and means for keeping the sleeve from turning off from the threaded portion of the stem, the said means and the threads and a portion of the sleeve effecting a lost motion driving connection between the sleeve and stem.

4. A stud driver, comprising an enlarged portion that is threaded, a cap nut fitted behind said enlarged portion, and a sleeve having an interiorly threaded portion for engaging the threads of the enlarged stem portion and the threads of the nut.

5. A stud driver, comprising a stem having an enlarged portion which is threaded, a cap nut fitted behind the enlarged portion and having a threaded portion of the same diameter as the threaded portion of the stem, and a sleeve having an outer internally threaded portion for engaging the threads of the stud and an inner threaded portion for engaging the threads of the stem and cap nut, the said threads of the stem, the cap nut and the threads and adjacent portions of the sleeve being arranged to effect a lost motion driving connection between the sleeve and the stem.

6. A stud driver, comprising a stem having an enlarged portion which is threaded, a sleeve threaded on its interior at its outer end by threads of less pitch than the aforementioned threads and threaded at its inner end with threads complementary to the threads of the enlarged portion of the stem, and means engaging behind the enlarged portion of the stem to prevent the stem backing out of the sleeve when undesired, the parts being arranged to effect a lost motion driving connection between the stem and the sleeve.

7. A stud driver, comprising a stem provided with an enlarged portion having threads, a sleeve having its inner end internally threaded to engage the threads of the enlarged portion and its outer end threaded to engage over a screw stud, and a cap nut engaging on the stem behind the enlarged portion and having threads of substantially the same pitch as the enlarged portion of the stem, the said sleeve fitting over the threads of the stem and the cap nut, and the stem, cap nut and sleeve being arranged to give a lost motion driving connection between the stem and the sleeve, for the purpose specified.

In witness whereof I have hereunto set my hand on the 13th day of November, 1918.

FRANK M. FUNK.